US00RE39867E

(19) United States
(12) Reissued Patent
Bennett et al.

(10) Patent Number: US RE39,867 E
(45) Date of Reissued Patent: Oct. 9, 2007

(54) TAMPER-EVIDENT CONTAINER CLOSURE

(76) Inventors: Paul H. Bennett, 317 W. First St., #A, San Dimas, CA (US) 91773; Thom M. Perlmutter, 17 Attleboro, Portsmouth, RI (US) 02871

(21) Appl. No.: 11/285,728

(22) Filed: Nov. 21, 2005

Related U.S. Patent Documents

Reissue of:
(64) Patent No.: 6,332,550
Issued: Dec. 25, 2001
Appl. No.: 09/440,903
Filed: Nov. 16, 1999

U.S. Applications:
( 63) Continuation of application No. 09/014,075, filed on Jan. 27, 1998, now Pat. No. 6,050,436, which is a continuation of application No. 08/697,272, filed on Aug. 21, 1996, now Pat. No. 5,711,443, which is a continuation of application No. 08/157,730, filed on Nov. 24, 1993, now abandoned.

(51) Int. Cl.
*B65D 41/18* (2006.01)

(52) U.S. Cl. ..... 215/256; 215/251; 215/258; 220/255; 220/256.1

(58) Field of Classification Search ..... 215/253, 215/254, 256, 228, 258; 220/255, 212, 212.5, 220/256.1, 257.1, 257.2
See application file for complete search history.

(56) References Cited

U.S. PATENT DOCUMENTS

| | | | |
|---|---|---|---|
| 2,326,480 | A | 8/1943 | Merolle |
| 2,806,620 | A | 9/1957 | Blanch |
| 3,750,821 | A | 8/1973 | Sourbet et al. |
| 3,901,403 | A | 8/1975 | Menke |
| 4,109,816 | A | 8/1978 | Faulstich |
| 4,205,755 | A | 6/1980 | de Wijn |
| 4,595,110 | A | 6/1986 | Herr |
| 4,597,500 | A | 7/1986 | Stubbs |
| 4,746,035 | A | 5/1988 | Anderson et al. |
| 4,863,050 | A | 9/1989 | Perry |
| 5,711,443 | A | 1/1998 | Bennett ..... 215/256 |

*Primary Examiner*—Nathan J. Newhouse
*Assistant Examiner*—James Smalley
(74) *Attorney, Agent, or Firm*—Stetina Brunda Garred & Brucker

(57) ABSTRACT

A tamper-evident closure for a container includes an outer tamper-evident cap engagable over an inner container sealing cap which may form part of the tamper-evident closure or part of the container, cap retaining prongs on the outer cap which permit placement of the outer cap on the container neck over the sealing cap but prevent upward removal of the outer cap from the container, a tear strip for severing the outer cap between its upper and lower ends to permit upward removal of the upper portion of the outer cap from the container, and a circumferential rupture line along which the outer cap separates to evidence tampering if an attempt is made to forcibly remove the outer cap from the container without tearing the tear strip from the outer cap.

18 Claims, 3 Drawing Sheets

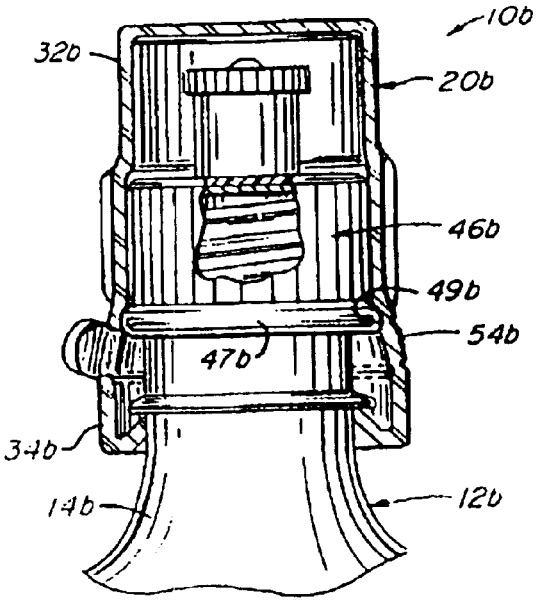
FIG.—5
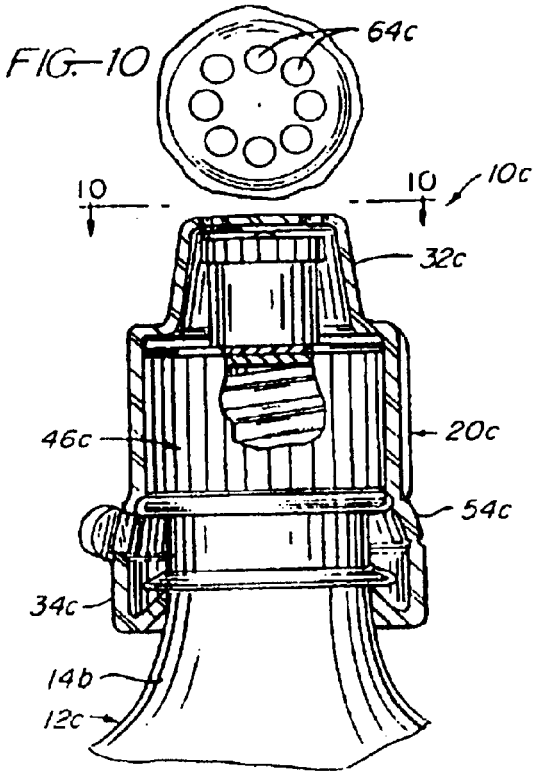
FIG.—10
FIG.—6
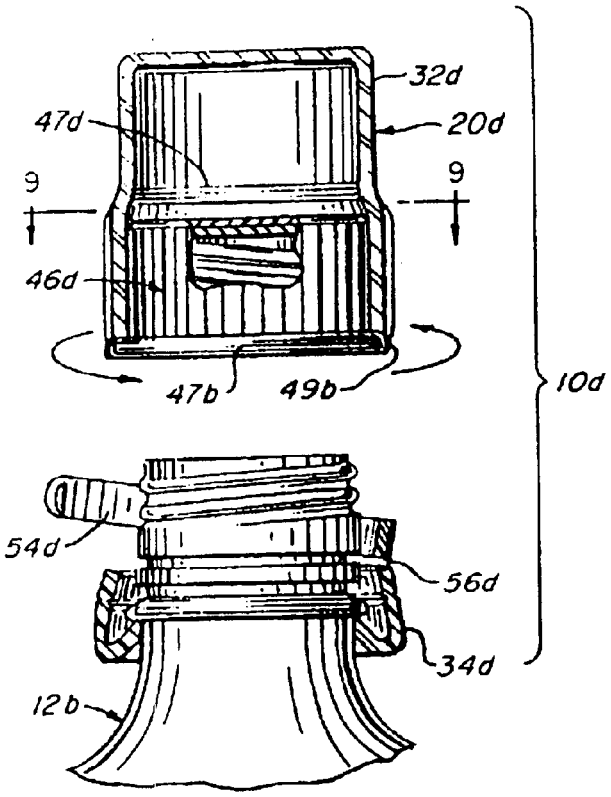
FIG.—7
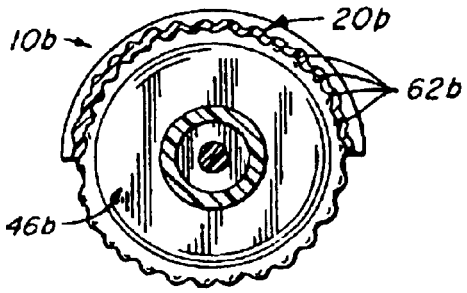
FIG.—8
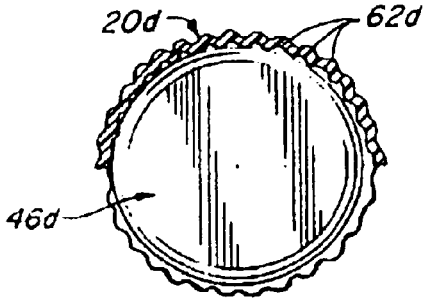
FIG.—9

TAMPER-EVIDENT CONTAINER CLOSURE

Matter enclosed in heavy brackets [ ] appears in the original patent but forms no part of this reissue specification; matter printed in italics indicates the additions made by reissue.

RELATED APPLICATIONS

The present application is a continuation of U.S. application Ser. No. 09/014,075, entitled TAMPER-EVIDENT CONTAINER CLOSURE filed Jan. 27, 1998, and now U.S. Pat. No. 6,050,436 issued Apr. 18, 2000, which is a continuation of U.S. application Ser. No. 08/697,272, entitled TAMPER-EVIDENT CONTAINER CLOSURE filed Aug. 21, 1996, and now U.S. Pat. No. 5,711,443 issued Jan. 27, 1998*, which is a continuation of U.S. application Ser. No. 08/157,730, entitled TAMPER EVIDENT CONTAINER CLOSURE filed on Nov. 24, 1993, now abandoned.*

BACKGROUND OF THE INVENTION

1. Field of the Invention

This invention relates generally to closures for containers and more particularly to an improved tamper-evident container closure.

2. Discussion of the Prior Art

Containers of the kind with which this invention is concerned are used to contain a wide variety of products including both liquids and solids. These products may be divided into two broad categories which are (a) products for human consumption or application to the human body, such as medicinal and non-medicinal liquids, solids, lotions, pills, capsules and the like, and (b) other products, such as household products and the like. This invention is particularly concerned with containers for category (a) products and will be described in the context of such containers. It will become readily evident as the description proceeds, however, that the closure may also be used on containers for category (b) products. While such containers vary widely in shape and size, they are all characterized by a container body having a normally upper portion or end containing an opening through which the container contents are accessed, and a closure in the form of a container sealing cap or the like to be secured to the upper portion or end of the container body for closing the opening. For convenience, this upper end portion of the container to which the container sealing cap is secured is referred to as the neck of the container regardless of the container shape.

A relatively few years ago, container of the character described were commonly closed by simple caps threaded or otherwise secured to the container necks. Over the years, tampering with such containers, particularly containers for the category (a) mentioned above, has become an ever increasing problem and danger. In many cases, tampering has involved the introduction of lethal substances into the containers which resulted in the deaths of persons who later consumed some of the container contents. For this reason, an ever increasing number of product containers of the kind described, particularly containers for category (a) products, are being made tamper-evident. In this context, tamper-evident means that it is readily evident from the appearance of the container closure whether or not the container has been previously opened.

A wide variety of ways have been devised to render containers tamper-evident. Following are some of these ways: enclosing a container in an outer tamper-evident package which cannot be opened without altering it in a manner which clearly indicates the package has been opened; evacuating and sealing a container in such a way that absence of the sound of air entering the container or some other sound resulting from the loss of container vacuum when the container is opened indicates the container has been previously opened; sealing a container with a tamper-evident closure which is torn, ruptured, or otherwise altered when opened.

SUMMARY OF THE INVENTION

This invention provides an improved tamper-evident closure for containers including an upper neck having an open normally upper end, and a circumferential shoulder about the neck below its upper end. This tamper-evident closure comprises a tamper-evident cap including a circumferential side wall having normally upper and lower ends, an upper end wall joined to the upper end of the side wall and closing the upper end of the cap, an opening in the lower end of the cap circumferentially surrounded by the lower end of said side wall, and cap retaining means on the lower end of the side wall engagable with the container shoulder to prevent upward removal of the cap from the container neck. The preferred cap retaining means are inwardly projecting resilient prongs which are spaced about the lower end of the cap side wall and are upwardly angled in a manner such that the container shoulder deflects these cap retaining prongs outwardly to permit the prongs to pass freely over the shoulder in the downward direction during placement of the cap on the container. The prongs then spring inwardly under the container shoulder to prevent upward removal of the cap from the container neck.

The side wall of the cap has a parting region extending circumferentially about the side wall between its ends at which the cap may be parted into upper and lower cap portions. These cap portions are joined along the circumferential parting region by junction means to which a force may be applied to part the cap along the parting region. Parting of the cap along this parting region permits removal of the upper cap portion from the container by a legitimate user to uncover the container neck and provides an indication to a prospective buyer or legitimate user that the container has been previously opened. In the preferred embodiments of the invention described herein, this junction means comprises a tear strip which may be pulled to sever the cap along the parting region.

In one presently preferred embodiment of the tamper-evident closure described herein the tamper-evident cap is designed to placed over the neck of a container having its own sealing cap. This tamper-evident cap is assembled on such a container by simply pushing the cap downwardly over the container neck and its sealing cap and serves as a tampering indicator only. Other preferred embodiments of the present tamper-evident closure described herein serve the dual purpose of a tampering indicator and a container seal. These dual purpose tamper-evident closures are designed for placement on containers which do not have their own sealing caps and include a tamper-evident cap similar to that of the single purpose tamper-evident closure mentioned above, and means within the cap for sealing the open upper end of container.

The preferred tamper-evident caps described herein have a frangible rupture line along the circumferential parting region of the cap which is stressed when any attempt is made to remove the closure from the container in any other way than by exerting a proper cap parting force on the junction means of the cap. For example, any attempt to unscrew the tamper-evident cap from the container will stress the cap along the rupture line, and this stress will cause the cap to rupture along the rupture line to indicate to a prospective purchaser or legitimate user that the container has been previously opened.

The preferred dual purpose tamper-evident closures described are tamper-evident cap assemblies having an outer tamper-evident cap like that discussed above which provides a tamper indicator for the container and an inner container sealing cap. This inner sealing cap is rotatable with the outer tamper-evident cap and includes internal screw threads for engaging the screw threads on the container neck and sealing means for sealing the open upper end of the neck. During assembly of a dual purpose tamper-evident closure or cap assembly on a container, the inner sealing cap is rotatable by rotation of the outer tamper-evident cap to screw the inner cap onto the container neck. It will become evident as the description proceeds, however, that a dual purpose cap according to the invention could have a unitary cap design in which the inner screw threads and container sealing means within the outer tamper-evident cap are an integral part of this cap.

A tamper-evident closure of the invention may be used on containers intended to be sealed by various types of sealing caps. For example, certain tamper-evident closures of the invention described herein are intended for use on containers which are normally closed by simple threaded sealing caps. Other described tamper-evident closures of the invention are intended for use on containers in the form of squeeze bottles which are normally closed by liquid dispensing caps.

BRIEF DESCRIPTION OF THE DRAWINGS

FIGS. 5 and 6 are views similar to FIG. 1 of further modified tamper-evident closures according to the invention for liquid dispensing containers and showing the caps in axial cross-section;

FIG. 7 illustrates the manner in which a tamper-evident closure according to the invention is parted to uncover the contents of the container on which the closure is mounted;

FIG. 8 is a section taken on line 8—8 in FIG. 5;

FIG. 9 is a section taken on line 9—9 in FIG. 7;

FIG. 10 is a view looking in the direction of the arrows on line 10—10 in FIG. 6;

DESCRIPTION OF THE PREFERRED EMBODIMENTS

Figure 1:
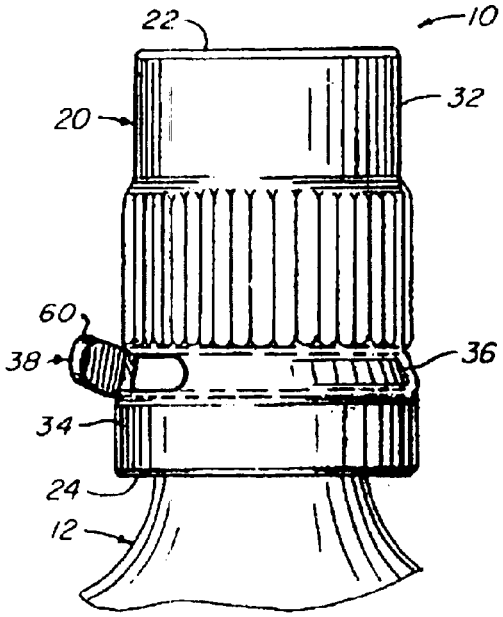
FIG. 1 illustrates a tamper-evident closure according to the invention assembled on a container.
Figure 2:
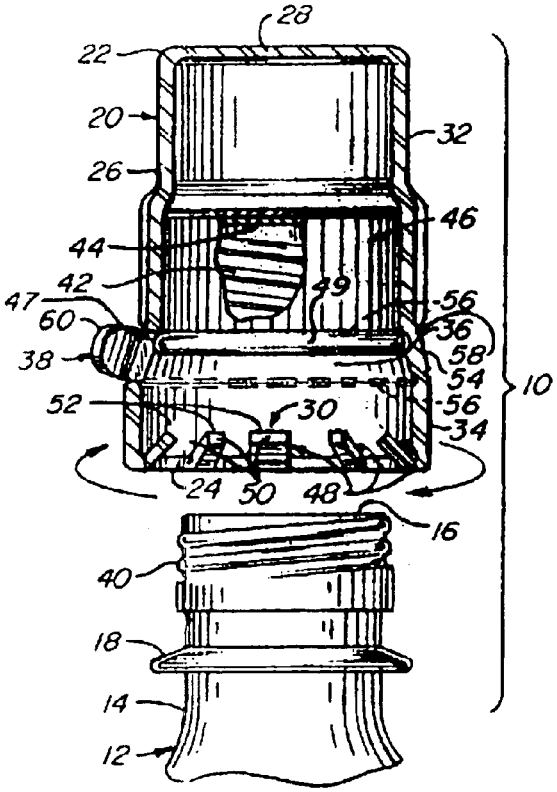
FIG. 2 illustrates the tamper-evident closure and container in FIG. 1 in disassembled relation and shows the closure in axial cross-section.

Referring now to these drawings and first to FIGS. 1 and 2, there is illustrated a tamper-evident closure 10 according to the invention for a container 12. The container has a normally upper neck 14 with an open normally upper end 16. Extending about the neck a distance below its upper end is a circumferential shoulder 18. The particular tamper-evident closure 10 illustrated is a dual purpose tamper-evident closure which both seals the open upper end 16 of the container neck 14 and provides tamper-evident protection, that is a tampering indicator, for the container. In this regard, it was noted evident" means that the closure serves as a tampering indicator which provides a clear indication to a purchaser or user whether or not the container has been previously opened.

The tamper-evident closure 10 comprises a tamper-evident cap 20 having normally upper and lower ends 22 and 24, a generally cylindrical side wall 26, and an upper end wall 28 joined to the upper end of the side wall and closing the upper end of the cap. The lower end of the cap is open. Joined to the lower end of the cap side wall 26, about the lower end opening in the cap, are cap retaining means 30 which engage the lower side of the container shoulder 18 to prevent upward removal of the tamper-evident cap 20 from the container neck 14.

The tamper-evident cap 20 includes upper and lower cap portions 32, 34, a parting region 36 extending circumferentially about the cap side wall 26 between these upper and lower cap portions at which the cap may be parted to separate the upper cap portion 32 from the lower cap portion 34, and junction means 38 joining the cap portions along the parting region. A force may be applied to this junction means to part the cap side wall 26 along the parting region 36 in a manner which serves the twofold purpose of indicating the container has been opened and permitting upward removal of the upper cap portion 32 from the container neck to enable a legitimate user to access the container contents.

The tamper-evident container closure 10 illustrated in FIGS. 1 and 2 is a dual purpose closure which is designed for use on a container 12 that lacks its own sealing cap or other sealing means for sealing the open upper end of the container neck 14 but does have external screw threads 40 at the upper end of the neck. This dual purpose closure 10 includes internal screw threads 42 for engaging the container screw threads 40 and sealing means 44 for sealing the open upper end of the container neck 14. The tamper-evident closure 10 is assembled on the container 12 by placing the closure over the container neck 14 and rotating the tamper-evident cap 20 of the closure in a direction to screw the closure onto the container to a position wherein the closure is tightly secured to the neck and the sealing means 44 presses firmly against the upper end of the neck about the opening in the neck to seal the opening. During this assembly of the closure 10 on the container, the retaining means 30 pass freely over the container shoulder 18 in the downward direction to a position in which the retaining means engages the underside of the shoulder to prevent upward removal of the closure from the container. The container can be opened only by exerting an appropriate force on the junction means 38 to part the upper cap portion 32 of the closure from the lower cap portion 34 of the closure. The upper portion of the tamper evident closure 10 (i.e. the upper portion 32 of the closure cap 20 and the sealing means 44 within the cap) is then removable from the container by rotating the upper cap portion 32 in a direction to unscrew the upper closure portion from the container neck to access the contents of the container through the open upper end of the container neck 14.

Referring now in more detail to FIGS. 1 and 2, the illustrated dual purpose tamper-evident closure 10 is a cap assembly including the tamper-evident cap 20, which constitutes an over cap or outer cap of the cap assembly, and an inner container sealing cap 46. The inner cap 46 engages the upper portion 32 of the outer cap 20 in such a way that the inner cap is rotatable with the outer cap. For example, the inner cap may be pressed into, bonded to, or otherwise permanently fixed within the upper portion of the outer cap. Alternatively, the two caps 20, 46 may be restrained against relative rotation by inter engaging serrations on the inner surface of the upper portion 32 of the outer cap 20 and the outer surface of the inner cap 46, as described in connection with FIGS. 8 and 9, which serrations may or may not permit axial separation of the caps. In the particular closure embodiment illustrated, the inner cap 46 is assumed to have a sufficiently snug fit within the outer cap 20 to firmly fix the inner cap in the outer cap and restrain the caps against relative rotation. The outer cap 20 has a downwardly facing internal circumferential shoulder 47 along the upper edge of the circumferential parting region 36 engagable by an external circumferential bead or shoulder 49 about the lower end of the inner cap 46 to limit axial insertion of the inner cap into the outer cap 20. The container sealing means 44 of the tamper-evident closure 10 comprises a sealing pad within the upper end of the inner cap 46. The internal screw threads 42 of the closure 10 are on the inner surface of the inner cap. The outer cap may have external serrations to facilitate gripping and rotating the cap.

The cap retaining means 30 on the outer tamper-evident cap 20 comprises a plurality of upwardly angled, resiliently flexible prongs 48 circumferentially spaced about the inner side of and integrally joined to the lower end of the outer cap side wall 26. These prongs extend inwardly toward the longitudinal axis of the outer cap and upwardly toward the upper end of the outer cap at an oblique angle to the cap side wall 26. As shown in FIG. 2, the prongs 48 have inner end surfaces 50 which generally parallel the longitudinal axis of the outer cap 20 and intersect the upper surfaces of the prongs along relatively sharp edges 52 which are normally disposed substantially in a common plane transverse to the cap axis. As explained below, during assembly of the tamper-evident closure or cap assembly 10 on the container 12, the cap retaining prongs 48 flex upwardly and outwardly toward the outer cap wall 26 to permit the prongs to pass over the container shoulder 18. The prongs then spring inwardly below the shoulder to prevent upward removal of the cap assembly from the container.

The junction means 38 of the tamper-evident cap assembly 10 is a tear strip comprising a circumferential portion 54 of the outer cap side wall 26 between the upper an lower outer cap portions 32, 34. This portion 54 of the outer cap side wall 26 is joined to the upper and lower cap portions 32, 34 along circumferential frangible rupture or tear lines 56 formed by circumferential grooves 58 in the side wall 26 and slits in the side wall spaced along the grooves. Integrally joined to one end of the tear strip 38 is a pull tab 60 overlying an opening 61 in the cap side wall 26 which permits grasping of the pull tab. The tear strip 38 may be pulled by grasping and pulling on the pull tab 60 to sever the outer cap side wall 26 along the tear lines 56. Severing the outer tamper-evident cap 20 in this way parts the cap along the parting region 36 in a manner which serves the twofold purpose of indicating the container has been opened and separating the upper cap portion 32 from the lower cap portion 34 to permit upward removal of the upper cap portion from the container 12.

The tamper-evident closure 10 is used in this way. The closure 10 is assembled on the container 12 by placing the closure axially downward over the upper end of the container neck 14 to an initial position in which the threads 44 on the inner cap 46 engage the threads 40 on the container. The outer cap 20 is then rotated to rotate the inner cap 46 relative to the container in a direction to screw the inner cap, and thereby the entire closure, onto the container. The closure is finally tightened to firmly press the inner cap seal 44 against the upper end 16 of the container neck 14 and thereby seal the container. During this assembly of the closure 10 on the container 12, the retaining prongs 48 on the outer tamper-evident cap 20 engage the container shoulder 18 and are deflected upwardly and outwardly by the shoulder to permit the prongs to pass over the shoulder. The prongs then spring inwardly below the shoulder to prevent upward movement of the cap assembly from the shoulder.

The container 12 can be easily opened by a buyer or user by grasping and pulling on the pull tab 60 to tear the tear strip 38 from the outer tamper-evident cap 20. The upper portion 32 of the outer cap 20 is thereby parted from the lower cap portion 34 to permit removal of the upper cap portion and the inner cap 46 from the container. Removal of the upper portion 32 of the outer tamper-evident cap 20 and the inner cap 46 from the container is accomplished by rotating the upper portion 32 of the outer cap in a direction to unscrew the inner cap 46 from the container. The container may be reclosed by replacing the inner cap 46 on the container after removing the inner cap from the outer cap portion 32, if this is possible, or along with the outer cap portion 32 in the event that this outer cap portion and the inner cap are permanently joined.

Obviously, any attempt to tamper with the container 12 by opening the container in the manner explained above would be immediately evident to a prospective purchaser or user. The container cannot, however, be opened in any other way for tampering purposes without the closure clearly evidencing such tampering. In this regard, the frangible rupture or tear lines 56 of the outer tamper-evident cap 20 are designed to rupture or tear if the a person seeking to tamper with the container attempts to open the container by simply unscrewing the closure 10, from the container. Thus, rotation of the closure in a direction to unscrew the inner sealing cap 46 from the container urges the inner cap shoulder 49 upwardly against the outer cap shoulder 47 and thereby urges the outer cap retaining prongs 48 upwardly against the lower side of the container shoulder 18. As a consequence, this rotation of the closure 10 urges the upper portion 32 of the outer cap 20 and inner cap 46 upwardly relative to both the container and the lower portion 34 of the outer cap and thereby stresses the outer cap along the frangible tear or rupture lines 56 of the outer cap. The outer cap is designed to rupture along one or both of theses lines under this stress to indicate container tampering. As explained later in connection with FIG. 7, this feature of the tamper-evident closure also permits the closure to be opened by a purchaser or legitimate user by either rotating the outer cap of the closure in a direction to unscrew the inner sealing cap from the container or by pulling the closure tear strip.

It is evident from the foregoing description that if the inner sealing cap of the tamper-evident closure or cap assembly 10 of FIGS. 1 and 2 is fixed within the outer tamper-evident cap 20, the closure is a dual purpose tamper-evident closure for use on a container 12 lacking its own sealing cap and provides both a sealing closure for sealing the container and a tampering indicator for evidencing tampering with the container. On the other hand, if the inner sealing cap 46 is separable from the outer tamper-evident cap 20 and forms part of the container 12, the tamper-evident closure 10 is a single purpose closure which provides tamper-evident protection only. In this disclosure, it is assumed that the tamper-evident closure 10 is a dual purpose closure in which the inner cap 46 is fixed within the outer cap 20 so that the closure both seals the container and provides a tampering indicator for the container.

Figure 3:
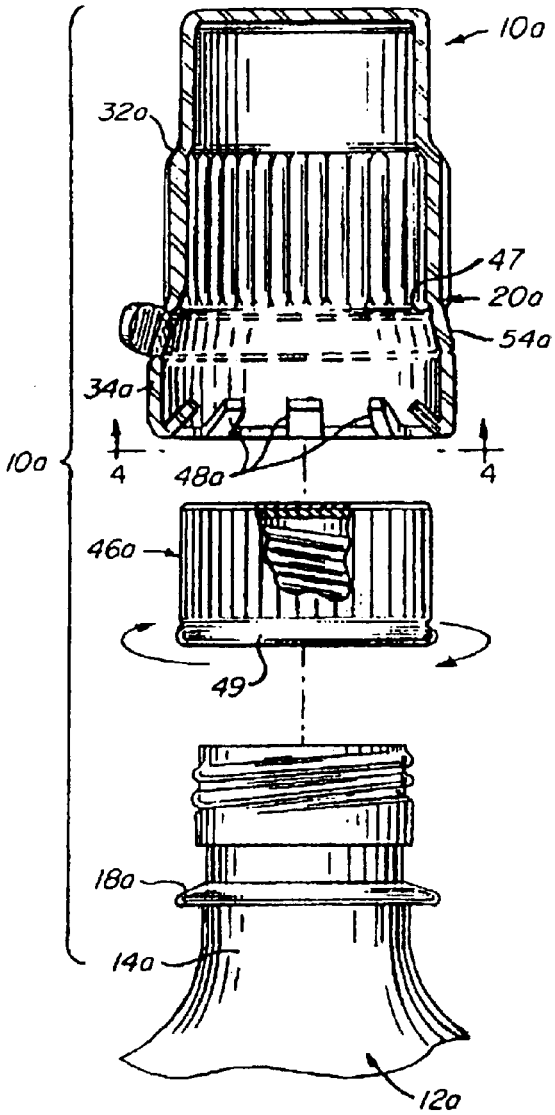
FIG. 3 is a view similar to FIG. 2 of a modified tamper-evident closure according to the invention.
Figure 4:
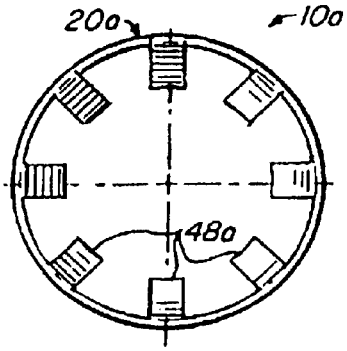
FIG. 4 is a view looking in the direction of the arrows online 4—4 in FIG. 3.

The modified tamper-evident container closure 10a of FIGS. 3 and 4 is designed for use on a container 12a having its own sealing cap 46a and is essentially identical to the tamper-evident closure 10 of FIGS. 1 and 2 except that the inner sealing cap 46a of closure 10a is axially separable from the outer tamper-evident cap 20a and forms part of the container rather than part of the closure 10a. The outer cap is assembled over the inner cap in the manner described below. The inner cap 46a may be freely rotatable in the outer cap, or the outer and inner caps may restrained against relative rotation, as by inter-engagable inner and outer longitudinal serrations on the inner and outer caps, respectively, similar to those described in connection with FIGS. 8 and 9, which permit the outer cap to be placed over the inner cap in the manner described below and interregnal to prevent relative rotation of the caps. In the particular embodiment illustrated, the inner cap is rotatable within the outer cap. From the foregoing description, it is evident that the tamper-evident closure 10a comprises the tamper-evident cap 20a only and is a single purpose closure which functions as a tempering indicator only.

The modified tamper-evident closure 10a is used in this way. The container sealing cap 46a will be tightly threaded on the neck 14a of the container 12a to seal the upper open end of the neck, prior to assembly of the tamper-evident cap 20a on the container. The cap 20a is assembled on the container by simply pushing the cap downwardly over both the container neck 12a and the sealing cap 46a, on the neck to a position in which the cap retaining prongs 48a engage under the container shoulder 18a. In this regard, it will be understood from the description to this point that when the tamper-evident cap 20a is pushed downwardly over the container neck, the retaining prongs 48a on the cap are deflected outwardly by the container shoulder 18a to permit the prongs to pass over the shoulder in much the same way as the prongs 48 in FIGS. 1 and 2 are deflected outwardly by the container shoulder 18 when the closure 10 is screwed onto the container neck 14. The prongs 48a then spring inwardly under the shoulder to prevent upward removal of the cap 20a from the container. The caps 20a, 46a have engageable inner and outer shoulders 47a, 49a, respectively, like the earlier described caps 20, 46, which limit entry of the inner cap into the outer cap.

The container 12a is opened by first pulling the tear strip 38a of the tamper-evident cap 20a to part the upper cap portion 32a from the lower cap portion 34a in the same manner as explained in connection with FIGS. 1 and 2. This releases the upper cap portion 32a for upward removal of this upper cap portion from the container. Removal of the upper cap portion 32a, in turn, exposes the container sealing cap 46a for removal from the container 12a by unscrewing the sealing cap from the container. Any attempt to force the tamper-evident cap 20a upwardly from the container without pulling the tear strip 38a for the purpose of tampering with the container will result in rupture of the cap along its tear lines 56a to indicate that such tampering has occurred.

FIG. 5 illustrates a further modified tamper-evident container closure 10b according to the invention assembled on a container 12b. Closure 10b comprises a tamper-evident cap 20b identical to the tamper-evident caps 20, 20a of FIGS. 1–4. Container 12b is identical to the containers 12, 12a of FIGS. 1–4, except that container 12b is a squeeze bottle for containing a liquid or semi-liquid product. The upper open end of the container neck 14b is closed by a sealing cap 46b which, in this case, is a squeeze bottle dispensing cap like that described in U.S. Pat. No. 5,145,094. As described in this patent, the intended use of the dispensing cap 46b requires that this cap remain on the container and be exposed to permit adjustment of dispensing cap between its open and closed positions and dispensing of the container contents through the cap. Accordingly, the dispensing cap 46b, like the sealing cap 46a in FIGS. 3 and 4, is not permanently fixed within the tamper-evident cap 20b.

The dispensing cap 46b may be associated with the tamper-evident cap 20b in either of two different ways. According to one of these ways, the dispensing cap forms part of the container 12b and is placed on the container prior to and totally independent of placement of the tamper-evident cap 20b on the container. In this case, the tamper-evident cap 20b is internally sized to fit loosely or slidably over the dispensing cap 46b and is applied to the container 12b by pushing the tamper-evident cap downwardly over the container neck 14b and the dispensing cap 46b in the same manner as described above in connection with FIGS. 3 and 4. According to another way of associating the tamper-evident cap 20b and the container dispensing cap 46b, the dispensing cap forms part of tamper-evident closure 10b and is removably fitted within the upper portion 32b of the tamper-evident cap in such a way that the inner dispensing cap is rotatable with but axially separable from the outer tamper-evident cap, as explained in connection with FIGS. 1 and 2. Both caps may then be assembled on the container 12b simultaneously by rotating the outer cap 20b in a direction to screw the inner cap 46b onto the container neck in much the same manner as described earlier in connection with FIGS. 1 and 2. In both cases, the tamper-evident cap 20b provides a tamper indicator for the container 12b, and the upper portion 32b of the cap 20b is removed from the container 12b and its dispensing cap 46b to access the dispensing cap by first pulling the tear strip 38b to part the upper tamper-evident cap portion 32b from the lower cap portion 34b and the removing the upper cap portion upwardly from the dispensing cap.

The inner dispensing cap 46b may be removably and non-rotatably engaged within the outer tamper-evident cap 20b in various ways. According to the preferred practice of the invention, this is accomplished by providing the inner dispensing cap and the upper portion 32b of the outer tamper-evident cap with longitudinal serrations 62b, as shown in FIG. 8. These serrations slidably engage one another when the outer and inner caps are assembled, either by pushing the outer cap downwardly over the inner cap when placing the outer cap on the container 12b (if the inner cap forms part of and is previously assembled on the container), or by insertion of the inner cap into the outer cap prior to placing either cap on the container (if the inner cap forms part of the closure 10b). The serrations 62b effectively key the two caps against relative rotation in such a way as to (a) enable the inner dispensing cap 46b to be screwed onto the container neck 14b by rotation of the outer tamper-evident cap 20b, (b) permit entry of the dispensing cap into the tamper-evident cap prior to or during assembly of the outer cap on the container, and (c) permit upward removal of the upper tamper-evident cap portion 32b from the dispensing cap after this upper cap portion has been severed from the lower cap portion 34b by pulling the tear strip 54b of the tamper-evident cap. The caps 20b, 46b have engageable inner and outer shoulders 47b, 49b, respectively, like the earlier described caps 20, 46 and 20a, 46a, which limit entry of the inner cap into the outer cap.

FIGS. 6 and 10 illustrate a further modified tamper-evident closure 10c according to the invention assembled on a container 12c. Closure 10c comprises a tamper-evident cap 20c identical, except for the differences noted below, to the tamper-evident cap 20b of FIG. 5. Container 12c is a squeeze bottle identical to the squeeze bottle container 12b of FIG. 5. The upper open end of the container neck 14b is closed by a sealing and dispensing cap 46c identical to the dispensing cap 46b of FIG. 5.

The tamper-evident cap 20c and dispensing cap 46c may be associated in either of the two different ways discussed above in connection with FIG. 5. Thus, the dispensing cap 46c may form part of the container 12c and be placed on the container prior to and totally independent of placement of the tamper-evident cap 20c on the container. In this case, the tamper-evident cap 20c is pushed downwardly over the container neck 12c and the dispensing cap 46c. Alternatively, the dispensing cap 46c may be removably fitted into the upper portion 32c of the tamper-evident cap 20c in such a way that the inner dispensing cap forms part of the tamper-evident closure and is rotatable by rotation of the outer tamper-evident cap. In this latter case, both caps are assembled on the container 12c simultaneously by rotating the outer cap 20c to screw the inner cap 46c onto the container in the same way as described above in connection with FIG. 5. The tamper-evident cap 20c thus provides a tampering indicator for the container 12c, and the upper portion 32c of the cap 20c is removed from the container 12c and its dispensing cap 46b to access the dispensing cap by first pulling the tear strip 54c to part the upper tamper-evident cap ox 32c from the lower cap portion 34c and then removing the upper cap portion upwardly from the dispensing cap.

The tamper-evident cap 20c differs from the tamper-evident cap 20b of FIG. 5 only in the following respects. The upper end of the upper cap portion 32c of cap 30c is reduced in diameter and tapered to fit more closely about the upper end of the dispensing cap 46c, as shown. Also, the upper end of the upper cap portion contains a circular row of holes 64c for aiding molding of the cap 20c.

The modified tamper-evident closure 10d of FIGS. 7 and 9 can be considered to be identical to either the closure 10 of FIGS. 1 and 2 or the closure 10a of FIGS. 3 and 4 except that the outer tamper-evident cap 20d and the inner container sealing cap 46d have inter-engaging serrations 62d (FIG. 9) like those in FIG. 8 to firmly secure the caps against relative rotation. The inner sealing cap 46d may be part of the outer tamper-evident cap 20d, in which case the inner cap is fixed within the outer cap, and the two caps are simultaneously assembled on the container 12d by rotating the outer cap to screw the inner cap on the container in the same manner as described in connection with FIGS. 1 and 2. Alternatively, the inner cap 46d may be part of the container 12d, in which case the inner cap is assembled on the container prior to and independently of placement of the outer tamper-evident cap on the container, and the outer cap is assembled on the container by pushing the outer cap downwardly over the container neck and the inner cap in the same manner as described in connecting with FIGS. 3 and 4. In either case, the container 12d may be opened by tearing off the closure tear strip 38d and unscrewing the sealing cap 46d form the container in the same manner as explained earlier in connection with FIGS. 1–4.

FIG. 7 illustrates an alternative way of removing the outer tamper-evident cap 20d and the inner container sealing cap 46d from the container 12d by rotating the outer cap and hence the inner cap in a direction to unscrew the inner cap from the container. In this regard, it will be understood that rotation of the caps in a direction to unscrew the inner cap from the container causes the inner cap to exert an upward thrust on the upper portion 32d of the outer cap by virtue of engagement of the outer bead or shoulder 49d on the inner cap with the inner shoulder 47d on the outer cap. The lower portion 34d of the outer cap, on the other hand, is fixed against upward movement relative to the container by engagement of the cap retaining prongs 48d with the container shoulder 18d. Accordingly, unscrewing the inner cap by rotating the outer cap in the manner described stresses the rupture lines 56d of the outer cap 20d in the axial direction of the outer cap. These rupture lines are designed to part under this stress, as illustrated in FIG. 7, to separate the upper portion 32d of the outer cap 20d from the lower portion of the latter cap and thereby permit removal of the inner sealing cap 46d from the container 12d. Any attempt to tamper with the container by removing the caps in this way will also cause parting of the outer cap to evidence such tampering.

FIGS. 11–14 illustrate the presently preferred tamper-evident container closure 10e of this invention. This preferred closure is generally similar to the earlier described tamper evident closures of the invention. Thus, the preferred closure 10e includes an outer tamper-evident cap 20e having upper and lower portions 32e, 34e, respectively, joined to one another along a circumferential parting region 36e by a circumferential junction means 38e forming a tear strip. This tear strip 38e may be pulled to sever the cap 20e along circuferential rupture or tear lines 56e and thereby separate the cap portions 32e, 34e. At the lower open end of the cap 20e are cap retaining means 30e in the form of inwardly and upwardly extending prongs 48e joined to and spaced circumferentially about the lower end of the cap.

Within the outer tapmer evident cap 20e in an inner container sealing cap 46e. As in the tamper evident closures of FIGS. 1–4 and 7, the inner sealing cap 46e may be part of the outer tamper-evident cap 20e, in which case the inner cap may be separable from or fixed within the upper portion 32e of the outer cap and the two caps may be simultaneously assembled on the container by rotating the outer cap to screw the inner cap on the container in the same manner as described in connection with FIGS. 1 and 2. Alternatively, the inner cap 46e may be part of the container, in which case the inner cap is separable from the outer tamper evident cap 20e and assembled on the container prior to and independently of placement of the outer cap on the container. The outer cap is the assembled on the container by pushing the outer cap downwardly over the container neck and the inner sealing cap, as described in connection with FIGS. 3 and 4.

The tamper-evident cap 20e and the container sealing cap 46e differ from those of FIGS. 1–4 and 7 in the following respects, Within the upper portion 32e of the tamper-evident cap 20e, th cap side wall 26e has a plurality of alternating, inner and outer longitudinal flute-like recesses or channels 70e, 72e, respectively, spaced circumferentially about the cap. These recesses, in turn, form a plurality of alternating, inner and outer longitudinal ribs 74e, 76e, respectively, spaced circumferentially about the cap. The inner surfaces of the inner ribs are cylindrically curved to a common radius about the longitudinal axis of the cap 20e. The outer surfaces of the outer ribs are also cylindrically curved to a common radius about the longitudinal axis of the cap 20e. The inner ribs 74e have lower ends 78e located in a common plane transverse to the longitudinal axis of the cap 20e and forming within the cap downwardly facing shoulders 47e (only one shown) at the lower end of the upper cap portion 32e. Within the lower portion 34e of the cap 20e are a plurality of circumferentially spaced rectangular holes 80e in the cap side wall 26e aligned with the inner cap prongs 48e, respectively. The cap is injection molded from a suitable plastic, and the holes 80e are sized and shaped to received retractable parts (not shown) of the injection mold which cooperate with other parts (not shown) of the mold to form the prongs 48e during the modeling process. The outer ends of the side edges of each prong 48e are integrally joined to the lower ends of the side edges of th respective cap side wall hole 80e. The prongs are resiliently flexible to permit the prongs to pass over the shoulder (not shown) on the container neck (not shown) during assembly of the cap on the container in same way as explained in connection with the earlier described embodiments of the invention. Except for the differences noted above and other minor differences of shape end size, the tamper-evident cap 20e is essentially identical to and used in essentially the same way as the earlier described tamper-evident caps of FIGS. 1–4 and 7.

The container sealing cap 46e is essentially identical to the earlier describe sealing caps of FIGS. 1–4 and 7 and differs from these earlier caps only in the following respects. The sealing cap 46e is cylindrically curved to an external radius approximating the common radius of curvature of the inner surfaces of the inner ribs 74e on the tamper-evident cap 20e. More specifically, the cap 46e is externally sized to have either a relatively snug fit or a somewhat loose or sliding fit within the upper portion 32e of the cap 20e depending upon whether the cap 48e is intended to remain in the upper cap portion 32e and form part of the tamper-evident closure 10e or is intended to be separable from the cap 20e and form part of the container. Circumferentially spaced about the exterior of the sealing cap 46e are pairs 82e of longitudinal spline-like ribs 84e which extend upwardly from the external bead or shoulder 49e about the lower end of the cap. The rib pairs 82e are sized and shaped to engage within certain of the inner recesses 72e in the tamper-evident cap 20e in the manner shown in FIG. 14 when the cap 20e is assembled over the sealing cap 46e. This engagement of the rib pairs 82e in the cap recesses 72e secures the caps 20e, 46e against relative rotation, whereby the sealing cap 46e is rotatable by the tamper-evident cap. The outer sealing cap shoulder 49e is engageable with the inner tamper-evident cap shoulders 47e to limit upward movement of the sealing cap in the tamper-evident cap.

From the above description, it is evident that the tamper-evident cap 20a and the container sealing cap 46e are assembled on a container (not shown) of the type described earlier and are removable from the container in the same manner as explained in connection with FIGS. 1–4 and 7. Accordingly, no further description of FIGS. 11–14 is necessary.

Figure 11:
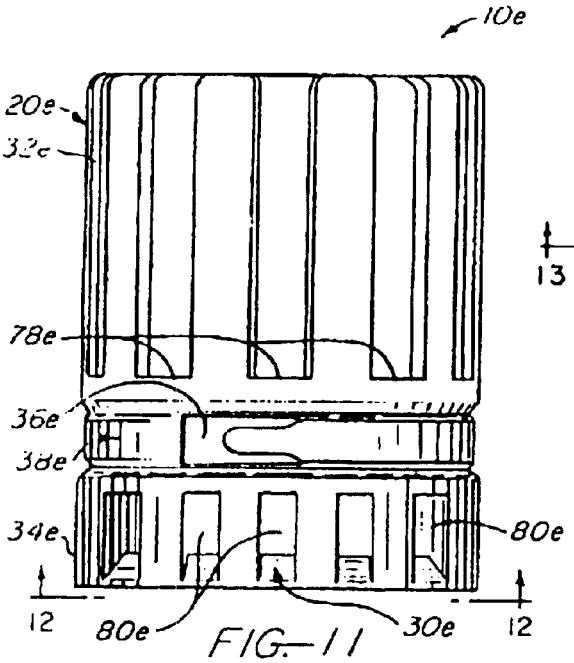
FIG. 11 is a side elevation of a presently preferred tamper-evident container closure according to the invention.
Figure 14:
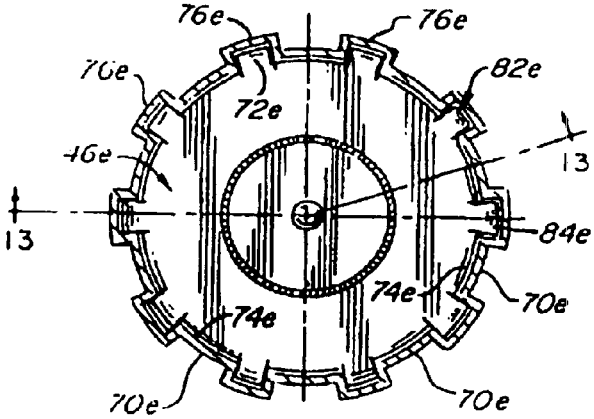
FIG. 14 is a section taken on line 14—14 in FIG. 13.
Figure 12:
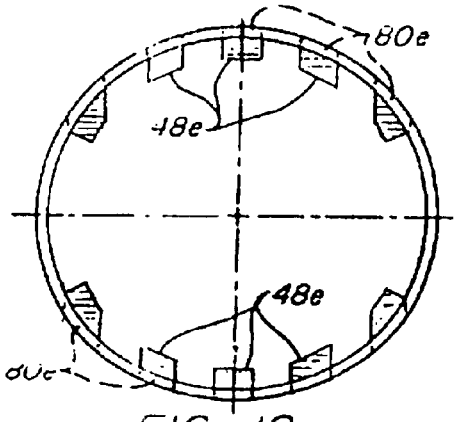
FIG. 12 is section taken on line 12—12 in FIG. 11.
Figure 13:
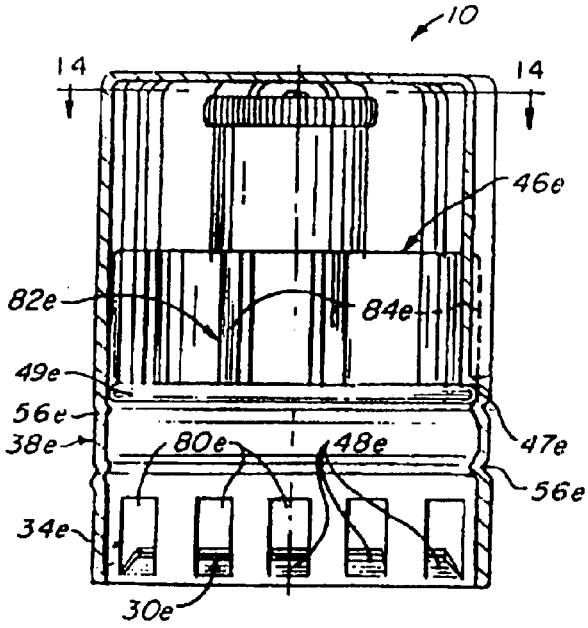
FIG. 13 is a longitudinal section through the closure in FIG. 11 taken on line 13—13 in FIG. 14.
Figure 15:
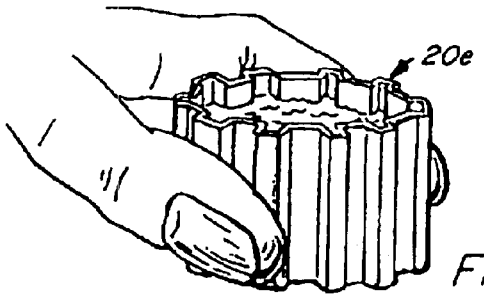
FIG. 15 is a perspective view showing the outer cap portion of the container closure of FIG. 11 grasped as a drinking vessel by the fingers of a user.

FIG. 15 illustrates an auxiliary use of the outer cap 20e of the tamper-evident container closure of FIG. 11, and shows it in use as a drinking vessel or cup being grasped by the hand of a user. Such use of the outer cap is particularly convenient for such purposes as the taking of prescription drugs or other medicaments provided in the container on which the container closure is provided.

What is claimed is:

1. A tamper evident closure for a container having a neck defining an open upper end and an annual shoulder extending about the neck in close proximity to the open upper end thereof, the tamper evident closure comprising:

a sealing cap attachable to the neck in a manner enclosing the open upper end thereof;

a tamper evident cap cooperatively engaged to the sealing cap and including a selectively fracturable parting region which, when fractured, allows at least a portion of the tamper evident cap to be separated and removed form the sealing cap; and a closure retaining section coupled to the sealing cap and advanceable over the shoulder of the container upon the attachment of the sealing cap to the neck thereof;

the parting region being formed within the tamper evident enclosure such that the fracture of the parting region occurs as a result of the engagement of the closure retaining section to the shoulder upon the movement of the sealing cap away from the shoulder subsequent to the attachment of the sealing cap to the neck.

2. The tamper evident closure of claim 1 wherein the tamper evident cap is cooperatively engaged to the sealing cap via interengaging serrations which are formed on the tamper evidence cap and the sealing cap.

3. The tamper evident closure of claim 1 wherein the tamper evident cap includes a removable tear strip which defines the parting region thereof.

4. The tamper evident closure of claim 3 wherein:

the tear strip of the tamper evident cap extends between upper and lower cap portions thereof; and the tamper evident cap is sized and configured relative to the sealing cap such that the removal of the tear strip therefrom allows for the separation and removal of the upper cap portion from the sealing cap.

5. The tamper evident closure of claim 4 wherein the closure retaining section is formed on the lower cap portion of the tamper evident cap.

6. A tamper evident closure for a container having an externally threaded neck defining an open upper end and an annual shoulder extending about the neck in close proximity to the open upper end thereof, the tamper evident closure comprising:

an internally threaded sealing cap threadably engageable to the neck in a manner enclosing the open upper end thereof, the threadable engagement of the sealing cap to the neck being facilitated by the rotation of the sealing cap in a first direction;

a tamper evident cap cooperatively engaged to the sealing cap in a manner wherein the rotation of the sealing cap facilitates the rotation of the tamper evident cap, the tamper evident cap including a selectively fracturable parting region which, when fractured, allows at least a portion of the tamper evident to be separated and removed from the sealing cap; and a closure retaining section coupled to the sealing cap and advanceable over the shoulder of the container upon the threadable engagement of the sealing cap to the neck thereof;

the parting region being formed within the tamper evident closure such that the fracture of the parting region occurs as a result of the engagement of the closure retaining section to the shoulder upon the rotation of the sealing cap in a second direction opposite the first direction subsequent to the threadable engagement of the sealing cap to the neck.

7. The tamper evident closure of claim 6 wherein the tamper evident cap is cooperatively engaged to the sealing cap via interengaging serrations which are formed on the tamper evident cap and the sealing cap.

8. The tamper evident closure of claim 6 wherein the tamper evident cap includes a removable tear strip which defines the parting region thereof.

9. The tamper evident closure of claim 8 wherein:

the tear strip of the tamper evident cap extends between upper and lower cap portions thereof; and the tamper evident cap is sized and configured relative to the sealing cap such that the removal of the tear strip therefrom allows for the separation and removal of the upper cap portion from the sealing cap.

10. The tamper evident closure of claim 9 wherein the closure retaining section is formed on the lower cap portion of the tamper evident cap.

11. A tamper evident closure for a container having a neck defining an open upper end and at least one annular shoulder extending about the neck in close proximity to the open upper end thereof, the tamper evident enclosure comprising;

a sealing cap attachable to the neck in a manner enclosing the open upper end thereof;

a tamper evident cap cooperatively engaged to the sealing cap and including a selectively fracturable parting region which, when fractured, allows at least a portion of the tamper evident cap to be separated and removed from the sealing cap; and a closure retaining section coupled to the sealing cap and advanceable over the shoulder of the container upon the attachment of the sealing cap to the neck thereof;

the parting region being formed within the tamper evident closure such that the fracture of the parting region occurs as a result of the movement of the sealing cap relative to the container subsequent to the attachment of the sealing cap to the neck.

12. The tamper evident closure of claim 11 wherein the tamper evident cap is cooperatively engaged to the sealing cap via interengaging serrations which are formed on the tamper evident cap and the sealing cap.

13. A tamper evident closure for a container having an externally threaded neck defining an open upper end and at least one annular shoulder extending about the neck in close proximity to the open upper end thereof, the tamper evident closure comprising:

an internally threaded sealing cap threadably engageable to the neck in a manner enclosing the open upper end thereof, the threadably engagement of the sealing cap to the neck being facilitated by the rotation of the sealing cap in a first direction;

a tamper evident cap cooperatively engaged to the sealing cap in a manner wherein the rotation of the sealing cap facilitates the rotation of the tamper evident cap, the tamper evident cap including a selectively fracturable parting region which, when fractured, allows at least a portion of the tamper evident cap to the separated and removed from the sealing cap; and a closure retaining section coupled to the sealing cap and advanceable over the shoulder of the container upon the threadable engagement of the sealing cap to the neck thereof;

the parting region being formed within the tamper evident closure such that the fracture of the parting region occurs as a result of the rotation of the sealing cap in at least one of the first direction and a second direction opposite the first direction subsequent to the threadable engagement of the sealing cap to the neck.

14. The tamper evident closure of claim 13 wherein the tamper evident cap is cooperatively engaged to the sealing cap via interengaging serrations which are formed on the tamper evident cap and the sealing cap.

15. A tamper evident closure for a container having a neck defining an open upper end and at least one annual shoulder extending about the neck in close proximity to the open upper end thereof, the tamper evident closure comprising:

a sealing cap attachable to the neck in a manner enclosing the open upper end thereof;

a tamper evident cap cooperatively engaged to the sealing cap and including a selectively fracturable parting region which, when fractured, allows at least a portion of the tamper evident cap to be separated and removed from the sealing cap; and a closure retaining section coupled to the sealing cap and advanceable over the shoulder of the container upon the attachment of the sealing cap to the neck thereof;

the parting region being formed within the tamper evident closure such that the fracture of the parting region occurs as a result of the application of torque to the tamper evident closure subsequent to the attachment of the sealing cap to the neck.

16. The tamper evident closure of claim 15 wherein the tamper evident cap is cooperatively engaged to the sealing cap via interengaging serrations which are formed on the tamper evident cap and the sealing cap.

17. A tamper evident closure for a container having an externally threaded neck defining an open upper end and at least one annual shoulder extending about the neck in close proximity to the open upper end thereof, the tamper evident closure comprising:

an internally threaded sealing cap threadably engageable to the neck in a manner enclosing the open upper end thereof, the threadable engagement of the sealing cap to the neck being facilitated by the rotation of the sealing cap in a first direction;

a tamper evident cap cooperatively engaged to the sealing cap in a manner wherein the rotation of the sealing cap facilitates the rotation of the tamper evident cap, the tamper evident cap including a selectively fracturable parting region which, when fractured, allows at least a portion of the tamper evident to be separated and removed from the sealing cap; and a closure retaining section coupled to the sealing cap and advanceable over the shoulder of the container upon the threadable engagement of the sealing cap to the neck thereof;

the parting region being formed within the tamper evident closure such that the fracture of the parting region occurs as a result of the application of torque to the tamper evident closure in the first direction subsequent to the threadable engagement of the sealing cap to the neck.

18. The tamper evident closure of claim 17 wherein the tamper evident cap is cooperatively engaged to the sealing cap via interengaging serrations which are formed on the tamper evident cap and the sealing cap.

* * * * *